Figure 1:
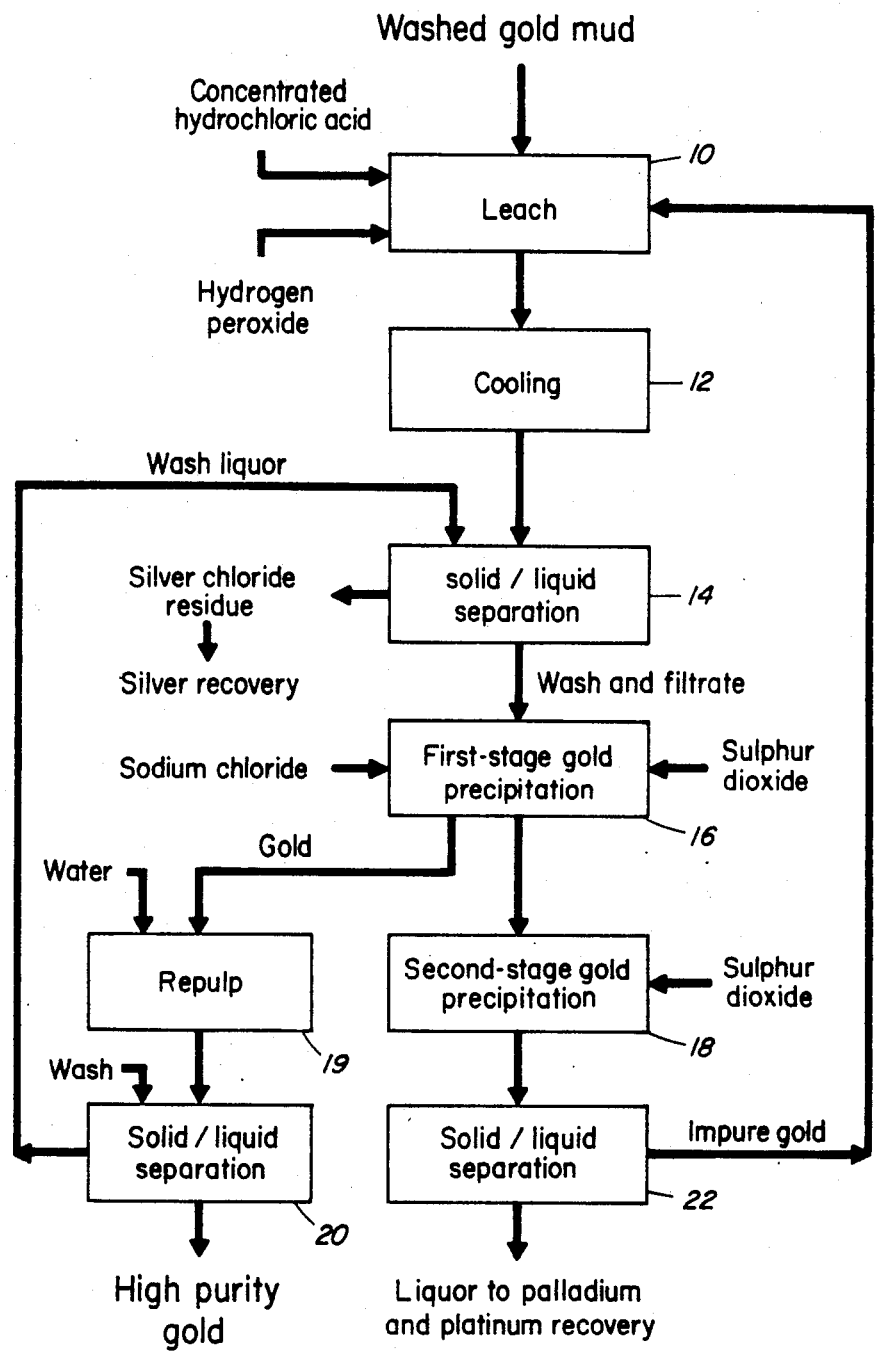

United States Patent [19]

Stanley et al.

[11] Patent Number: 4,670,052

[45] Date of Patent: Jun. 2, 1987

[54] PROCESS FOR THE RECOVERY OF GOLD FROM A PRECIOUS METAL BEARING SLUDGE CONCENTRATE

[75] Inventors: Robert W. Stanley; G. Bryn Harris, both of Kirkland; Serge Monette, Longueuil, all of Canada

[73] Assignee: Noranda, Inc., Toronto, Canada

[21] Appl. No.: 860,433

[22] Filed: May 7, 1986

[30] Foreign Application Priority Data

Aug. 7, 1985 [CA] Canada .................................. 488233

[51] Int. Cl.$^4$ .......................................... C22B 11/04
[52] U.S. Cl. ................................. 75/118 R; 75/101 R; 75/108; 75/114; 75/115; 75/121; 423/22; 423/27; 423/36; 423/38; 423/41; 423/42; 423/45; 423/46
[58] Field of Search ..................... 75/101 R, 108, 114, 75/115, 118 R, 121; 423/22, 27, 38, 36, 41, 42, 45, 46

[56] References Cited

U.S. PATENT DOCUMENTS

| | | | |
|---|---|---|---|
| 3,658,510 | 4/1972 | Hoffmann et al. | 75/99 |
| 4,094,668 | 6/1978 | Yannopoulos et al. | 75/114 |
| 4,244,734 | 1/1981 | Reynolds et al. | 75/118 R |
| 4,244,735 | 1/1981 | Reynolds et al. | 75/118 R |
| 4,337,226 | 6/1982 | Peasley | 423/22 |
| 4,389,248 | 6/1983 | Iio et al. | 75/118 R |
| 4,551,213 | 11/1985 | Wilson | 75/101 R |

FOREIGN PATENT DOCUMENTS

| | | | |
|---|---|---|---|
| 1154599 | 10/1983 | Canada | 53/232 |
| 1174860 | 9/1984 | Canada | 53/225 |

OTHER PUBLICATIONS

T. Okubo, T. Iio and M. Shuto, New Sumitomo Process for Gold Recovery from Copper Anode Slime, pp. 517–536, Proceedings of the AIME Annual Mtg. (1984).

Primary Examiner—John Doll
Assistant Examiner—Robert L. Stoll
Attorney, Agent, or Firm—Fleit, Jacobson, Cohn & Price

[57] ABSTRACT

A process for the recovery of gold from a precious metal bearing sludge concentrate is disclosed. The process comprises the steps of leaching the sludge with hydrochloric acid and hydrogen peroxide to solubilize at least gold, palladium and platinum, removing silver from the leach slurry as insoluble silver chloride and selectively precipitating gold from the leach solution remaining after removal of silver by reduction with $SO_2$ in the presence of sodium ions.

11 Claims, 1 Drawing Figure

PROCESS FOR THE RECOVERY OF GOLD FROM A PRECIOUS METAL BEARING SLUDGE CONCENTRATE

This invention relates to a process for the recovery of high purity gold from sludge concentrates containing precious metals, that is to say concentrates containing gold, silver and platinum group metals, more particularly electrolytic silver refinery anode sludge.

Electrolysis of dore metal and similar materials for the production of refined silver results in generation of an anode sludge containing gold, silver, platinum group metals and minor amounts of base metals. These sludges are typically treated by boiling in concentrated sulphuric acid to remove silver and base metals, leaving a gold sand which is thoroughly washed and then cast into anodes for electrolysis in Wohlwill cells. This process suffers from the disadvantages that (i) only limited amounts of palladium can be tolerated in the gold electrolyte before the electrolyte has to be treated for the recovery of palladium (and platinum) and (ii) during the concentrated sulphuric acid digestion step, the presence of any nitrates from the silver electrolyte promotes the dissolution of contained palladium, thereby creating a circulating load of palladium in the silver refinery.

Alternatively sludges or slimes which are rich in platinum group metals (Pt, Pd, Rh, Ir, Os, Ru) are treated with aqua regia to dissolve the primary precious metals (Au, Pt, Pd), leaving an insoluble residue suitable for further processing. In addition, alternative lixiviants such as $Cl_2/HCl$ and $Cl_2/H_2O$ as disclosed in Canadian Patent Nos. 928,966, 1,154,599 and 1,174,860 have been employed to take all the precious metals into solution with the exception of silver. Gold may be recovered from these leach liquors by precipitation with ferrous sulphate, sulphur dioxide, hydrogen peroxide, sodium sulphite or oxalic acid. Recently, solvent extraction processes have also been developed for the recovery of gold from relatively dilute solutions.

Dissolution in aqua regia and $Cl_2/HCl$ or $Cl_2/H_2O$ liberates noxious fumes ($NO_x$ and/or $Cl_2$). On the other hand, the use of solid reductants ($FeSO_4$, $Na_2SO_3$, $C_2H_2O_4$) renders it difficult to recover quantitatively high purity gold (>999.9 fine) from solution and hydrogen peroxide requires a large excess over stoichiometric for high gold recovery as disclosed in an article by T. Okubo et al. of Sumitomo Metal Mining Co, Ltd published in the Proceedings of the 1984 AIME Annual Meeting, page 517. Sulphur dioxide is the cleanest of the reductants and can be used to precipitate fine gold but it normally produces agglomerated and difficult to handle gold precipitates. The other reductants generate a gold sand, but at a penalty of a less pure precipitate. Solvent extraction of gold, followed by reduction from the organic phase with oxalic acid, produces fine gold, but most of the suitable organic solvents have a significant water solubility, necessitating the treatment of all aqueous streams for solvent recovery.

It is therefore the object of the present invention to provide a process in which high extractions of gold can be achieved without generating noxious fumes, and wherein an easily handled gold sand of high purity is produced.

The process, in accordance with the present invention, comprises the steps of leaching the sludge with hydrochloric acid and hydrogen peroxide to solubilize at least gold, palladium, and platinum, removing silver from the leach slurry as insoluble silver chloride, and selectively precipitating gold from the leach solution remaining after silver removal by reduction with $SO_2$ in the presence of sodium ions.

Leaching is carried out at a temperature from ambient to the boiling point, preferably 50° to 100° C.

Silver removal is preferably done by filtering the leach slurry to produce a leach filtrate suitable for gold recovery and a residue suitable for silver recovery. The leach slurry is preferably cooled to a temperature less than 35° C. prior to silver removal to minimize silver solubility.

Gold precipitation is preferably performed in two stages, a first stage in which the leach filtrate is sparged with $SO_2$ in the presence of sodium ions to precipitate up to about 95% of the contained gold as a high purity precipitate, and a second stage in which the liquor drained from the gold precipitate is sparged with $SO_2$ to precipitate an impure gold which is recycled to the leach and a gold free filtrate which is suitable for the recovery of palladium and platinum. The first stage gold gold precipitate is repulped with water, filtered, washed with water and dried to give a gold sand assaying >999.9 fine. Wash water is preferably recycled and combined with the leach filtrate.

It has been found that under the conditions of the leach, hydrogen peroxide can be used entirely as an oxidant by allowing it to react as it is added. An excess of up to 100%, preferably 10–50% would ensure maximum dissolution of the precious metals. Adding a large excess of peroxide causes it to react as a reductant as disclosed by Sumitomo referred to above.

Sodium ions at the level of 4 to 6 g/L have been found to prevent the formation of large, hard or sticky agglomerates during gold precipitation by $SO_2$. In addition, the presence of sodium results in appreciably less liquor retention in the precipitated gold. Higher or lower levels of sodium ions may be used by one skilled in in the art to achieve optimum results.

The invention will now be disclosed, by way of example, with reference to FIG. 1 which illustrates a schematic of the gold recovery circuit in accordance with the present invention and to the accompanying examples.

As shown in FIG. 1, washed silver refinery anode sludge (gold mud) containing for example 40–60% Au, 20–40% Ag, 4–10% Pd and 0.2–0.5% Pt is leached (stage 10) in concentrated hydrochloric acid at a temperature up to the boiling point and for a period of time sufficient to ensure dissolution of the precious metals. During leaching hydrogen peroxide is added as oxidant. An excess of up to 100% preferably 10–50% ensures maximum dissolution of the precious metals. Under these conditions, no noxious gases are generated and essentially all of the gold, palladium and platinum in the mud are taken into solution while silver is precipitated as silver chloride. The leach slurry is cooled to less than 35° C. (stage 12) to minimize silver solubility, filtered in a solid/liquid separation stage 14 and washed with recycled wash water from gold recovery, leaving a silver chloride residue suitable for silver recovery by any known process such as cementation with iron or smelting in a Dore furnace. The combined leach filtrate and wash are heated up to a temperature between ambient and about 100° C., preferably 90°–98° C., and sparged with $SO_2$ in the presence of sodium ions in a first gold precipitation stage 16 to precipitate up to about 95% of the gold. During sparging the potential reading of the solution will decrease from an initial level of 730–790 mV (saturated calomel electrode) and should not be allowed to go below 650 mV referably 680–695 mV. At this point, up to 95% of the gold would have precipitated. Solid/liquid separation is effected by draining the liquor through the gold precipitate to a second gold precipitation stage 18. The gold precipitate from the first stage precipitation is repulped with water (stage 19) at 5–70% solids, preferably 40–45% solids to break up the gold followed by filtration, washing and drying (stage 20) to give an easily handled gold sand of >999.9 fine. The wash liquor is recycled to the solid/liquid separation stage 14. The liquor fed to the second stage precipitation is reheated up to a temperature between ambient and about 100° C., preferably 90°–98° C., sparged with $SO_2$ until the potential reaches less than 400 mV, preferably 330–360 mV, and filtered in a solid/liquid separation stage 22 to produce an impure gold which is recycled to the leach stage 10, and a gold free filtrate suitable for the recovery of palladium and platinum by any suitable method such as, for example, by reduction with sodium formate.

EXAMPLE I

An 82.3 kg sample of wet (50.7% solids) gold mud assaying (dry basis) 56.0% Au, 9.46% Pd, 0.51% Pt and 21.8% Ag was slurried with 128 kg of commercial concentrated hydrochloric acid (31.45% HCl), the temperature rising from ambient (20° C.) to 58° C. Then 18 kg of 50% hydrogen peroxide was added over 1.5 hours, at a rate sufficient to maintain 95°–98° C. by heat of reaction. After two hours, the slurry was cooled to 25° C. to minimize silver solubility, filtered and the solids washed with water. The combined leach solution and wash (101.6 g/L Au, 15.9 g/L Pd, 1.18 g/L Pt) contained 99.1% of the gold, 99.7% of the palladium and 98.3% of the platinum. The silver chloride residue, 29.8% by weight of the feed, analyzed 72.9% Ag and contained 99.8% of the silver.

EXAMPLE II

A 73.6 kg sample of wet gold mud (55.3% solids), assaying (dry basis) 45.7% Au, 8.23% Pd, 0.47% Pt, 34.2% Ag, and 1.84 kg of wet (49.5% solids) recycled second-stage gold (85.7% Au, 9.87% Pd, 0.34% Pt) were leached with 129 kg of concentrated hydrochloric acid and 27 kg of 50% hydrogen peroxide as in Example I. Gold and palladium extractions were 98.3% and 98.2% respectively after 1.5 hours, and 98.9% and 98.4% respectively after 2 hours. The final platinum extraction was 93.0%, and the residue, 46.5% of feed weight, assayed 73.5% Ag and contained 99.8% of the silver.

EXAMPLE III

The combined leach and wash liquor (175 L) from Example I was heated to 95° C. and 17 g/L NaCl added. Sulphur dioxide gas was sparged at a rate of 15.1 L/min. until the potential reading of the solution had dropped from the initial level of 760 mV to 685–690 mV (saturated calomel electrode). The hot liquor was drained to a second tank, reheated to 95° C. and sparged further (second-stage) with sulphur dioxide (10.0 L/min.) until the potential reached 340 mV. The first-stage gold precipitate (85.8% solids of spongy consistency) was removed from the tank, repulped with water, filtered, washed with water on a vacuum filter, and dried, giving a gold sand, assaying >999.95 fine. The first-stage recovery of gold was 93.3%. The gold slurry from the second-stage was filtered to give a gold product assaying 94.6% Au, 3.3% Pd and 0.35% Pt which was returned to the next leach. The final solution assayed 0.87 mg/L Au, 13.4 g/L Pd and 1.02 g/L Pt.

EXAMPLE IV

A second (175 L) combined leach and wash solution (88.7 g/L Au, 15.2 g/L Pd) was treated in an identical manner to that in Example III, except that no sodium chloride was added and the reaction was halted at 695–700 mV. The first-stage gold, 63.2% of the total gold, was precipitated as large sticky agglomerates (66.3% solids) which were difficult to remove from the tank. This precipitate was difficult to repulp, and difficult to wash, although the product had a purity >999.94 fine. The second-stage precipitate was coarse (12% greater than 16 mesh), and could not be pumped to the filter, the liquor having to be drained from the tank.

EXAMPLE V

A further precipitation test was conducted with 175 L of leach liquor and wash, assaying 81.2 g/L Au, 14.7 g/L Pd, 0.49 g/L Pt, 7.59 g/L Cu, 0.75 g/L Pb, 0.31 g/L Se, 0.058 g/L Te, to which 17 g/L sodium chloride was added. Precipitation was carried out for 80 min. at a sparge rate of 30.8 L $SO_2$/min. at 95° C., the reaction being halted at 685–690 mV. The precipitated gold, after repulping and washing, assayed >999.96 fine and 81.8% of the total gold was recovered in the first-stage, with an $SO_2$ utilization efficiency of 81.9%. The remaining gold was precipitated at a sparge rate of 23.8 L $SO_2$/min. at 95° C. with a sulphur dioxide efficiency of 59.3%, and assayed 1.64% Pd, 0.084% Pt, 0.13% Cu, 0.017% 15 Pb, 0.23% Se and 0.16% Te. The final solution assayed 0.53 mg/L Au, 14.2 g/L Pd, 0.46 g/L Pt, 7.63 g/L Cu, 0.74 g/L Pb, 0.22 g/l Se and 0.033 g/L Te.

These examples demonstrate that high recoveries of gold, platinum and palladium are achieved in the leach, both from mud and recycled second-stage gold. They further demonstrate that up to about 95% of the gold in the leach liquor can be recovered directly in a state of high purity (>999.9 fine), and that the presence of sodium ions during gold precipitation results in gold precipitate that is easier to handle and has less liquor retention.

Although the invention has been disclosed with reference to a preferred flowsheet it is to be understood that it is not limited to such flowsheet but by the scope of the claims only.

We claim:

1. A process for the recovery of gold from a precious metal bearing anode sludge concentrate comprising the steps of:
    (a) leaching the sludge with hydrochloric acid and hydrogen peroxide to solubilize at least gold, palladium and platinum;
    (b) removing silver from the leach slurry as insoluble silver chloride; and
    (c) selectively precipitating gold with respect to palladium and platinum from the leach solution remaining after removal of silver by reduction with $SO_2$ in the presence of sodium ions which are added to the leach solution to prevent the formation of agglomerates during gold precipitation.

2. A process as defined in claim 1, wherein leaching is carried out at a temperature from ambient to the boiling point of the leach solution.

3. A process as defined in claim 2, wherein leaching is carried out at a temperature of 50° to 100° C.

4. A process as defined in claim 1, wherein silver removal is done by filtering the leach slurry to produce a leach filtrate for gold recovery and a residue for silver recovery.

5. A process as defined in claim 4, further comprising the step of cooling the leach slurry to a temperature less than 35° C. prior to silver removal to minimize silver solubility.

6. A process as defined in claim 4, wherein gold precipitation is performed in two stages, a first stage in which the leach filtrate is sparged with $SO_2$ in the presence of sodium ions to precipitate up to about 95% of the contained gold and a second stage in which the liquor drained from the gold precipitate is sparged with $SO_2$ to precipitate an impure gold.

7. A process as defined in claim 6, wherein gold precipitation is carried out at a temperature from ambient to about 100° C.

8. A process as defined in claim 7, wherein the potential of the leach filtrate is not allowed to go below 650 mV (saturated calomel electrode) during sparging in the first stage gold precipitation, and taken to below 400 mV during the second stage gold precipitation.

9. A process as defined in claim 6, wherein the first stage gold precipitate is repulped with water, filtered, washed with water and dried to give gold sand assaying >999.9 fine.

10. A process as defined in claim 9, wherein the wash water is recycled and combined with the leach filtrate.

11. A process as defined in claim 6, wherein the gold slurry from the second stage gold precipitation is filtered to give an impure gold product which is recycled to the leach and a gold-free filtrate which is suitable for recovery of palladium and platinum.

* * * * *